United States Patent

[11] 3,548,850

[72] Inventor Robert H. Bellman
Horseheads, N.Y.
[21] Appl. No. 612,012
[22] Filed Jan. 26, 1967
[45] Patented Dec. 22, 1970
[73] Assignee Corning Glass Works
Corning, N.Y.
a corporation of New York

[54] FLUIDIC SUMMING JUNCTION
7 Claims, 1 Drawing Fig.

[52] U.S. Cl. 137/81.5
[51] Int. Cl. F15c 1/12
[50] Field of Search 137/81.5

[56] References Cited

UNITED STATES PATENTS

| | | | |
|---|---|---|---|
| 3,080,886 | 3/1963 | Severson | 137/81.5 |
| 3,030,979 | 4/1962 | Reilly | 137/81.5 |
| 3,117,593 | 1/1964 | Sowers III | 137/81.5X |
| 3,148,691 | 9/1964 | Greenblott | 137/81.5 |
| 3,238,961 | 3/1966 | Hatch, Jr. | 137/81.5 |
| 3,244,370 | 4/1966 | Colston | 137/81.5X |
| 3,299,255 | 1/1967 | Bauer | 137/81.5X |
| 3,369,557 | 2/1968 | Wood | 137/81.5 |

*Primary Examiner*—Samuel Scott
*Attorneys*—Clarence R. Patty, Jr., Walter S. Zebrowski and William J. Simmons, Jr.

ABSTRACT: Disclosed is a fluid amplifier device which adds two pneumatic differential pressure signals into one pneumatic differential signal. Two fluid amplifiers have their output passages connected in such a manner that the algebraic sum of the inputs to both amplifiers is approximated by the output.

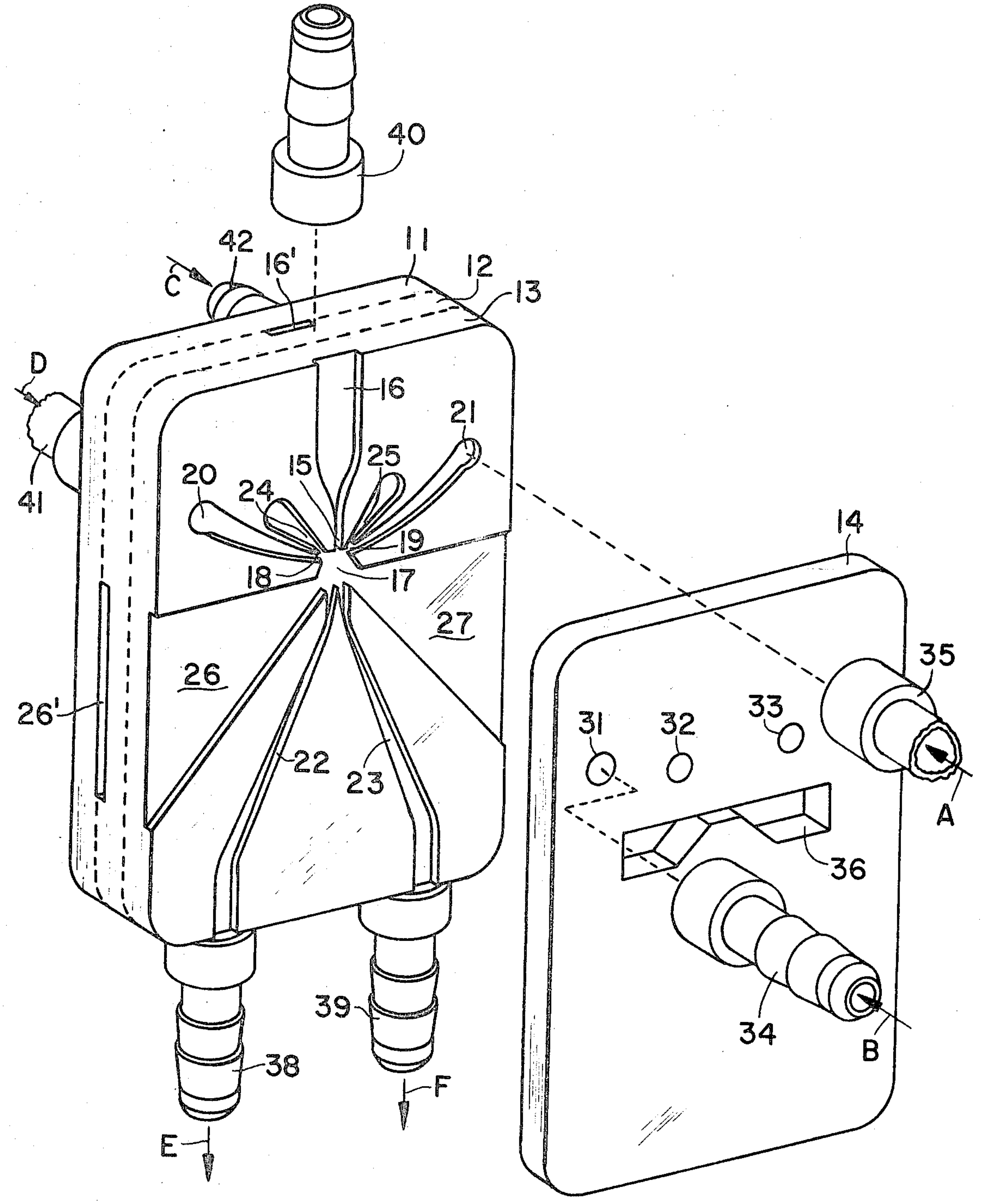
INVENTOR.
ROBERT H. BELLMAN
BY William J. Simmons Jr.
ATTORNEY

FLUIDIC SUMMING JUNCTION

Fluidic summing junctions provide the sum of two separate differential signals in one differential output. They are used for signal comparison and shaping in digital systems, analogue systems and digital analogue conversion systems. In the operation of a summing junction two sets of input control pressures which are hereinafter referred to as A and B, and C and D, affect the pressures in a pair of outputs E and F in the following manner. If the difference between the control pressures A and B is greater than the difference between control pressures D and C, then the output pressure F will be greater than the output pressure E by $n$ times the difference between the pressures A and B minus $n$ times the difference between the pressures C and D. This may be expressed mathematically as If $(A-B)>(D-C)$ then $F>E$ by $n[(A-B)-(D-C)]$ where $n$ is the gain of the fluid amplifiers.

Prior to this invention, summing junctions were made with both sets of inputs acting on the same supply jet. In accordance with this prior design, the differential inputs A and B were located on opposite sides of a power stream as in a conventional proportional amplifier, and a second set of differential signals C and D were located on opposite sides of the same power stream slightly downstream from the entrance of signals A and B. Assuming that signals A and C are on one side of the power stream and signals B and D are on the other side, and that signals C and D are slightly downstream from signals A and B, the following disadvantages arise. Crosstalk exists between signals A and C and between signals B and D. Also, the amplifier gain from inputs A and B is different from that of inputs C and D, the amplifier thereby contributing a nonlinearity to the output signal. Furthermore, an input at B changes the apparent impedance at D.

It is therefore an object of this invention to provide a fluid summing junction wherein the amplifier gains with respect to both sets of control pressures are the same, and wherein there is complete isolation between both sets of differential input signals.

Briefly, this invention comprises first and second fluid amplifier elements each having a power stream input passage, fist and second opposed control stream input passages, and first and second outlet passages. An interaction chamber is formed by the intersection of said input and outlet passages. The first outlet passages of said first and second fluid amplifier elements are connected to provide a first common output channel, and the second outlet passages of said first and second fluid amplifier elements are connected to provide a second common output channel. A first pair of differential fluid signals is applied to the first and second control stream input passages of the first fluid amplifier element, and a second pair of differential fluid signals is applied to the first and second control stream input passages of the second fluid amplifier element. The algebraic sum of the inputs to both amplifiers is approximated by the output which appears at the first and second common output channels.

The above and still further objects, features and advantages of the present invention will become apparent upon consideration of the following detailed description taken in conjunction with the accompanying drawing, wherein the sole FIG. shows a perspective and partially exploded view of a preferred embodiment of the present invention.

Referring to the FIG., a fluid summing junction is illustrated comprising the plates 11, 12, 13 and 14, within which suitable channels, passages and apertures are shown. Two identical proportional fluid amplifiers are formed by these plates, one amplifier consisting of the plates 11 and 12, the other consisting of the plates 13 and 14. Since the plates 11 and 12 are identical to the plates 14 and 13 respectively, the passages and apertures of only the plates 13 and 14 are illustrated.

The plates 11, 12, 13 and 14 may be formed of any suitable material such as glass, ceramic, plastics, metal, or the like, and may be secured, sealed, or bonded together by any suitable method well known to one familiar with the art such as fusion of the plates together, securing the plates with screws, and the like.

The stream fluid may be compressible such as air, nitrogen, or other gases, or incompressible such as water or other liquids. Both the compressible or incompressible fluids may contain solid material. This invention is not limited to any particular fluid.

A power nozzle 15, which may consist of a narrowed portion of a power stream passage 16, communicates with an end wall of a chamber 17 which is centrally located in the plate 13. A pair of control nozzles 18 and 19, which are located at the ends of the control stream input passages 20 and 21, respectively, communicate with opposite sides of the chamber 17. The chamber 17 is provided with two outlet or discharge passages 22 and 23. A pair of vent passages 24 and 25 communicate with the chamber 17 to stabilize the proportional amplifier formed by the plates 13 and 14. In addition, the vents 26 and 27, which vent the side portions of the chamber 17 to the ambient, prevent the power stream which issues from the nozzle 15 from locking on the wall portions of the outlet passages, and therefore, the power stream will be proportionally deflected through the outlet passages 22 and 23 in accordance with the differential in pressures existing at the control nozzles 18 and 19. The only passages of the proportional amplifier formed by the plates 11 and 12 which are visible in the FIG. are the power stream passage 16' and the side vent 26'.

A plurality of holes 31, 32 and 33 in the cover plate 14 communicate with the passages 20, 24 and 25. An input fitting 34 communicates with the hole 31, while a hole in the cover plate 14 which communicates with the passage 21 is obscured by the input fitting 35. An elongated vent 36 in the cover plate 14 communicates with the vents 26 and 27 and the chamber 17. An output fitting 38 communicates with the outlet passage 22 and its counterpart passage (not shown) in the plate 12. Similarly, the output fitting 39 communicates with the outlet passage 23 and its counterpart passage (not shown) in the plate 12. A power stream fitting 40 is adapted to communicate with the power stream passages 16 and 16'. A pair of input fittings 41 and 42 communicate with the control signal passages of the proportional amplifier consisting of the plates 11 and 12 in a manner similar to that in which the input fittings 34 and 35 communicate with the control signal passages in the amplifier consisting of plates 13 and 14. The depths of the power stream passages and the outlet passages may be increased in their respective plates near their associated fittings for a more efficient flow of fluid. These passages are shown as being a constant depth for the sake of simplicity and clarity.

The fluidic summing junction thus described comprises a pair of back-to-back proportional fluid amplifiers having a common power stream fitting 40, a pair of common output fittings 38 and 39, and two sets of input fittings, 34, 35 and 41, 42, one set associated with each proportional amplifier. The differential input pressures at input fittings 34 and 35 are illustrated by the arrows A and B while the differential pressures at the input fittings 41 and 42 are illustrated by the arrows C and D. The differential output pressure signals at output fittings 38 and 39 are illustrated by the arrows E and F. The differential in pressure of inputs A and B controls the outputs in the passages 22 and 23. This results in a change in the outputs E and F, but does not affect the output signals in the proportional amplifier consisting of the plates 11 and 12. A change in the differential pressure of inputs C and D causes a change in the outlet signal passages of the amplifier in the plates 11 and 12 but does not affect the outputs in the passages 22 and 23. A change in the pressure signals represented by A and B plus a change in the signal represented by C and D causes a corresponding change in the output signal represented by E and F which is related to both sets of input signal pressures. As indicated hereinabove, the relationship between input and output signal pressures is as follows: If the difference between the control pressures A and B is greater than the difference between the control pressures D and C, then the output pressure F will be greater than the output pressure E by $n$ times the difference between the control pressures A and B plus or minus $n$ times the difference between the control pressures D and C, depending on whether the relative amplitudes of the input signals are such that the signals in the outlet passages add or subtract, $n$ being the gains of the two fluid amplifiers.

The relative orientation of the two proportional fluid amplifiers other than the back-to-back relationship disclosed herein is not as satisfactory, since best results are obtained when the output signals are combined in the same direction of flow. If, for example, the two amplifiers were located end to end in the same plane and the output signals were combined in an opposing manner as at a T-junction, interaction between the two amplifiers would result. The back-to-back relationship permits the outlet signals of the two amplifiers to flow in the same direction in parallel planes, and thereafter to be added in an output fitting (or a similar enlarged tube). The orientation disclosed herein results in the least interaction between input signals and output signals of the two individual amplifiers.

Although the preferred embodiment of the fluid summing junction has been described as comprising two momentum deflection proportional amplifiers, a useful device can be constructed by combining two bistable fluid amplifiers in a similar manner. Assume that the possible differential input signals to such a device would be "O" (the pressures at inputs A and B are equal), input A is one level greater than input B or input B is one level greater than input A, and that the same possible variations exist for inputs C and D. Then, any one of three possible levels could exist at both outputs E and F. These outputs can be obtained by using the formula set forth hereinabove.

I claim:

1. A fluid-summing junction comprising:

a. first and second fluid amplifier elements each having a power stream input passage, first and second opposed control stream input passages, first and second outlet passages, and a chamber formed by the intersection of said input and outlet passages;

b. said first outlet passages of said first and second fluid amplifier elements being connected to provide a first common output channel;

c. said second outlet passages of said first and second fluid amplifier elements being connected to provide a second common output channel;

d. means to apply a first pair of differential fluid signals to said first and second control stream input passages of said first fluid amplifier element; and e. means to apply a second pair of differential fluid signals to said first and second control stream input passages of said second fluid amplifier element.

2. A fluid-summing junction in accordance with claim 1 which further comprises common fluid supply means connected to said power stream input passages of said first and second fluid amplifier elements.

3. A fluid-summing junction in accordance with claim 1 wherein said first and second fluid amplifier elements are mounted back-to-back so that the passages thereof lie in parallel planes.

4. A fluid-summing junction in accordance with claim 1 wherein said outlet passages of said first and second fluid amplifier elements are situated in parallel planes, the output fluid signals flowing therefrom flowing in the same direction when being combined in said common output channels.

5. A fluid-summing junction in accordance with claim 1 wherein said first and second fluid amplifier elements are proportional amplifiers.

6. A fluid-summing junction in accordance with claim 1 wherein said first and second fluid amplifier elements are bistable amplifiers.

7. A fluid-summing junction in accordance with claim 4 which further comprises common fluid supply means connected to said power stream input passages of said first and second fluid amplifier elements, the axis of that portion of said common fluid supply means adjacent said power stream input passages being substantially parallel with the axes of both of said power stream input passages.